Aug. 18, 1931.  M. R. SHIPLEY  1,819,343
VALVE AND PLUG SEATING MEANS FOR SAME
Filed Sept. 20, 1928

INVENTOR
Marion R. Shipley

Patented Aug. 18, 1931

1,819,343

UNITED STATES PATENT OFFICE

MARION R. SHIPLEY, OF HERMOSA BEACH, CALIFORNIA, ASSIGNOR, BY MESNE ASSIGNMENTS, TO MARTIN P. SMITH AND JOSEPH R. NEAVES, JR., TRUSTEES

VALVE AND PLUG SEATING MEANS FOR SAME

Application filed September 20, 1928. Serial No. 307,313.

The present invention relates to valves and pertains more particularly to valves of the type in which inlet and outlet ports are controlled by turning a tapered plug fitting in a tapered cavity.

In valves of this type pressure against one side of the plug, when the valve is in closed position creates side thrust to the extent that the valve cannot be opened manually against high pressure. It is therefore one of the objects of this invention to provide a valve in which pressure thrusts are distributed on opposed sides of the plug so that the plug is balanced against side thrust.

Also, in plug valves, springs or the like are usually required to hold the plug from becoming unseated and it is therefore another object of this invention to provide a valve of the class described in which the plug is self seating without the aid of springs or other mechanical means.

Another object of the invention is to provide a simple and efficient angle valve of comparatively slight resistance to fluid.

Other objects and advantages of my invention will appear hereinafter.

I have illustrated my invention by the accompanying drawings in which; I have shown one practical embodiment of my invention.

Figure 1:
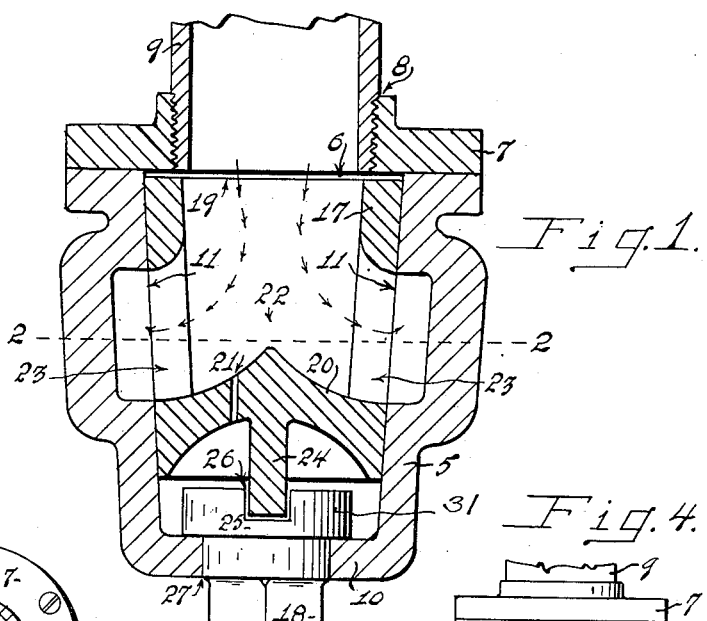
Figure 1 is a view in vertical section thereof.
Figure 3:
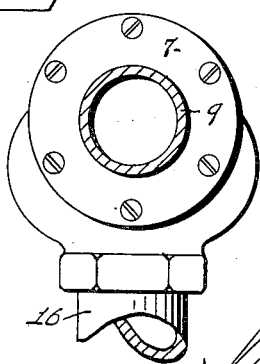
Fig. 3 is a plan view thereof, showing the valve in perspective.
Figure 4:
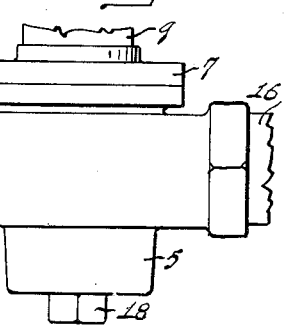
Fig. 4 is side elevation of Fig. 3.

In carrying out my invention in the present embodiment I provide a valve body having an annular wall 5 encompassing a vertical tapered plug cavity 6. The plug cavity is open at the upper end and fitted with a flange 7 having a threaded opening 8 to receive an inlet pipe 9. The opening 8 provides the inlet opening for the valve cavity 6 but the lower end of the plug cavity is closed as by the integral bottom wall 10.

Midway of its upper and lower terminations the annular body wall is provided with diametrically opposed outlet ports 11, 11. These ports each lead to a corresponding fluid course 12, 12 cored in the valve body and leading to a horizontally directed outlet fluid course 13 provided with the outlet opening 14. The margins of this opening are internally threaded as at 15 whereby the body is attached to another pipe 16.

The body is designed primarily to coact with a plug 17 to control flow of fluid from the inlet opening to the outlet opening, the plug being arranged so that it may be turned by an external key 18 to control such flow. The plug is open at the upper end as at 19 and closed at the lower end as at 20. A small by-pass port 21 is provided passing thru the closed end 20. The plug is hollow and of cup shape providing a central fluid course 22 and a pair of diametrically opposed outlet ports 23 arranged to register with the corresponding ports of the valve body. The bottom wall 20 of the plug provides a deflector which acts to divide fluid equally between the two outlet ports.

The lower end of the plug is provided with a depending vane 24 which is engaged by an inverted key 25 having a diametric slot 26 in which the vane 24 is disposed, so that turning of the key externally of the body will turn the plug. The key 18 passes thru an aperture 27 in the bottom wall of the valve and the projecting end of said key is provided with flat faces so that it may be readily engaged by a wrench or the like (not shown).

Figure 2:
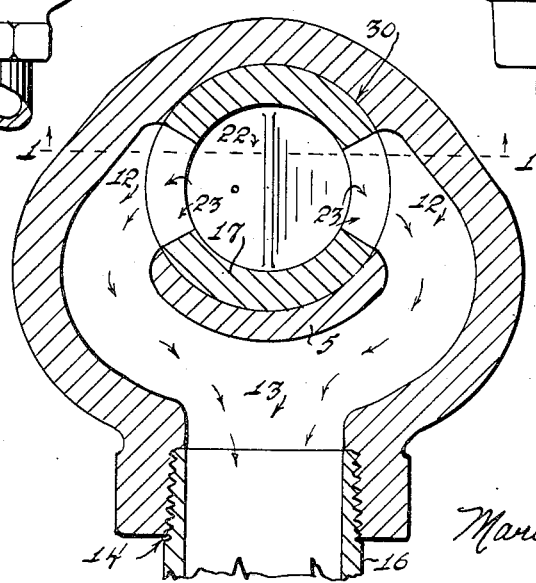
Figure 2 is a view in horizontal section thereof.

When the plug is turned by the key to the open position in which it is shown in Fig. 2, fluid may enter the inlet opening at the top of the body and pass into the interior of the plug via the upper open end thereof. The pressure of such fluid is transmitted to the lower end of the plug thru the by-pass opening so that the pressure is practically equalized at all times both when the valve is open or closed. When fluid is flowing thru the valve it escapes from the hollow of the plug thru the opposed plug openings and thru the alined body outlet ports into the outlet fluid courses and thence to the outlet end of the valve.

While such flow is taking place the velocity of the incoming fluid causes a slight downward thrust on the plug at all times so that it is properly seated in its cavity without the aid of springs or the like. The flow thru the valve is not accompanied by very sudden changes of direction or sudden changes of area of flow; as will appear from the drawings.

When the plug is turned a quarter of a revolution into closed position the outlet body ports are closed so that fluid cannot flow thru the valve. Full fluid pressure is exerted on the plug at the top, but such fluid pressure is also exerted on the bottom due to the by-pass port. Owing to the tapered outer surfaces 30 of the plug where they are exposed to the low pressure of the outlet ports when the valve is in closed position, a slight pressure differential exists which holds the plug seated properly but with only moderate pressure so that even under comparatively high fluid pressures it is still possible to turn the plug readily. In other words, the slight pressure differential during periods while the valve is closed, is employed to hold the plug seated, and while the valve is "open" the velocity of flow acts to keep the plug seated. The upper end of key 18 is provided with a flange 31 bearing against the bottom body wall 10 to prevent escape of fluid thru aperture 27 of the body.

This flange on the key is at all times held seated against leakage by reason of the by-pass port at all times subjecting the flange of the key to the full pressure of the inlet pipe.

It will be apparent now that at all times and at all positions of the plug, the key and plug are held seated: the key by the constant maximum pressure of the inlet pipe and the plug by the slight pressure differential produced either by the velocity of flow or by the tapered outer plug surfaces exposed to the body outlet openings.

While I have shown and described a specific embodiment of my invention I do not limit myself thereto and I may employ any construction or arrangement of parts coming within the scope of the appended claims without departing from the spirit of my invention.

I claim:

1. In a valve of the class described, a body provided with a vertical tapered bore, a top inlet opening for said bore and opposed side outlet openings leading from said bore, an annular walled tapered plug fitted to turn in said cavity; said plug being open at its large end to said bore and inlet opening, the underside of said valve plug being recessed and spaced apart from the bottom of the body; said plug further being provided with opposed side outlet ports of the same number and spacing as said side outlet openings and the upper surface of the bottom of said plug being extended upwardly in a central transverse plane between said outlet ports.

2. The valve as in claim 1 and in which said plug is provided with a lower by-pass communicating with underlying parts of said cavity; said body being provided with fluid courses, one for each side opening and converging to a single outlet.

3. The valve as in claim 1 and including a key having a portion in fluid tight contiguity with said body internally of said bore below said plug and further having a portion extended downwardly thru said body: said key being arranged to be turned to turn said plug to open and closed positions respectively; said plug being provided with a by-pass port whereby said key internally of said bore is subject to the pressure above said plug.

4. In a valve, a body having a vertically directed fluid space opening at the top of said body; said body providing a horizontal outlet course communicating with said fluid space by opposed side openings in said body, a plug in said space movable to control said openings, the underface of said plug being recessed and communicating with the chamber within the body of the plug and the upper surface of the bottom of the plug being provided with a transverse rib that is positioned between the openings in the sides of said plug.

5. In a valve, a plug consisting of an open end annular walled member provided with opposed side ports, a deflector between said ports, there being an opening formed through the bottom of said plug and the under surface of said plug being recessed.

6. In a valve, a housing provided with a tapered chamber, outlet ducts leading from opposite sides of said chamber, a tapered plug mounted in said tapered chamber and provided with opposed outlet ports that are adapted to communicate with the outlet ducts in said valve body, a transversely disposed deflector rib formed on the bottom of the valve plug between the outlet ports therein, the underside of said valve plug being recessed and having communication with the chamber in said plug, a web depending from the center of said valve plug and a key mounted for rotation in the valve housing below the plug therein, which key engages the web on said plug.

MARION R. SHIPLEY.